United States Patent

Wiedmann

[15] 3,655,999

[45] Apr. 11, 1972

[54] SHIFT REGISTER

[72] Inventor: Siegfried K. Wiedmann, Poughkeepsie, N.Y.

[73] Assignee: International Business Machines Corporation, Armonk, N.Y.

[22] Filed: Apr. 5, 1971

[21] Appl. No.: 131,154

[52] U.S. Cl. ..........................307/221 R, 307/288, 307/291, 307/299, 340/173 FF

[51] Int. Cl. ....................................G11c 19/00, H03k 3/286

[58] Field of Search..................307/221 R, 223 R, 299, 288, 307/291; 340/173 R, 173 FF

[56] References Cited

UNITED STATES PATENTS 3,134,026 5/1964 Earle.................................307/221 R

*Primary Examiner*—John Zazworsky
*Attorney*—Hanifin and Jancin and Martin G. Reiffin

[57] ABSTRACT

A shift register comprises a series of half-cells with means to transfer the information stored in each half-cell to the next half-cell in the series upon the application of a clock-pulse signal. The circuit is made with just two diffusion steps, obviating the need for an isolation diffusion or a subcollector diffusion.

10 Claims, 2 Drawing Figures

INVENTOR
SIEGFRIED K. WIEDMANN

BY Martin G. Reiffin

ATTORNEY

Patented April 11, 1972 3,655,999

2 Sheets-Sheet 2

SHIFT REGISTER

BACKGROUND OF THE INVENTION

1. Field of the Invention

The present invention relates to shift registers wherein information is stored in a series of cells and is transferred from each cell to the next cell upon the application of a clock-pulse signal. Such shift registers have a wide application and are used in digital computers and other digital apparatuses.

2. Description of the Prior Art

Shift registers are well-known in the prior art but embody several disadvantages obviated by the present invention.

More specifically, prior shift registers usually lack DC stability and require the application of clock-pulses for maintaining the stored information. The manufacture of the shift registers of the prior art usually requires isolation diffusion and subcollector diffusion steps. Furthermore, an excessive amount of power is generally required for maintaining the stored information.

SUMMARY OF THE INVENTION

It is a primary object of the present invention to provide a shift register having a novel arrangement for selecting and transferring the information.

Furthermore, a common ground plane is provided so that the structure may be fabricated with merely two diffusion steps, obviating any isolation diffusion or subcollector diffusion.

Also advantageous is the arrangement whereby clock-pulses are required only to shift information and are not required to store the information.

A further object of the present invention is to provide a novel shift register requiring relatively low DC power to maintain the stored information.

Still another object is to provide a novel shift register which is devoid of resistors so as to obviate the need for resistor diffusions.

DESCRIPTION OF THE PREFERRED EMBODIMENT

Figure 1:
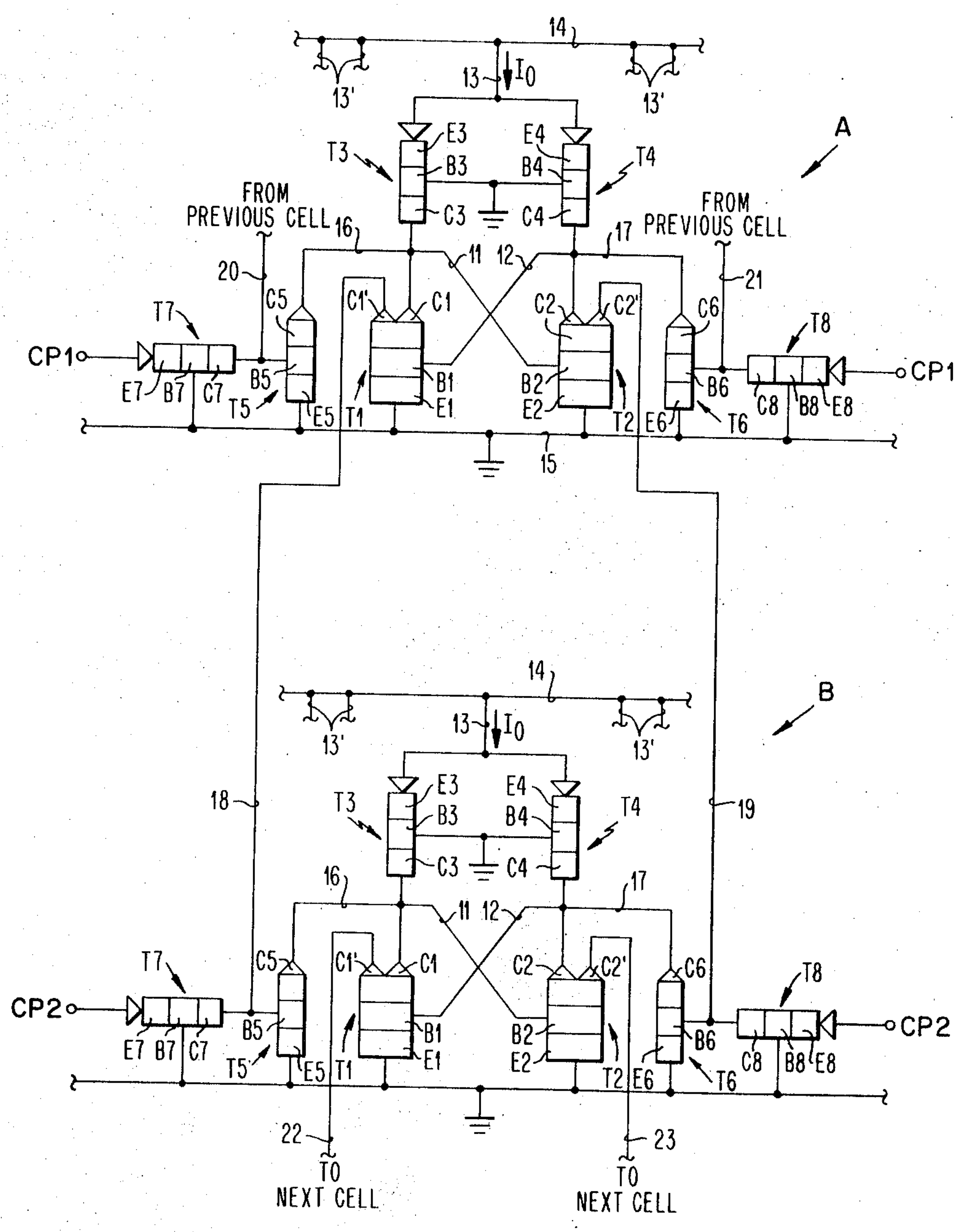
FIG. 1 is a schematic circuit diagram showing two adjacent half-cells of a shift register in accordance with the present invention.

Referring now to the schematic circuit diagram of FIG. 1 in more detail, the shift register in accordance with the present invention comprises a series of cells each including two substantially identical half-cells designated by the reference letters A and B in the drawing. The latter shows only a single cell and it will be understood that the other cells are identical and are connected to the disclosed cell by the leads designated "-FROM PREVIOUS CELL" and "TO NEXT CELL."

Each half-cell A and B comprises a flip-flop including transistors T1, T2 which are inversely operated. It will be noted that all of the NPN transistors in FIG. 1 are inversely operated. The collector C1 of transistor T1 is connected by lead 11 to the base B2 of transistor T2, and the collector C2 of transistor T2 is connected by lead 12 to the base B1 of transistor T1. Also connected to the collector C1 is the collector C3 of a PNP transistor T3, and the collector C4 of another PNP transistor T4 is similarly connected to the collector C2 of transistor T2. The bases B3 and B4 of transistors T3, T4 are grounded as shown. The emitters E3, E4 of transistors T3, T4 are connected to a lead 13 in turn connected to a line 14. Other cells (not shown) may be connected to line 14 by leads 13'.

The emitters E1, E2 of inversely operated transistors T1, T2 are connected to a ground line 15. Similarly connected to ground line 15 are the emitters E5, E6 of inversely operated transistors T5, T6. The collectors C5, C6 of transistors T5, T6 are connected by respective leads 16, 17 to the collectors C3, C4 and C1, C2.

The collector C7 of a lateral PNP transistor T7 is connected to the base B5 of transistor T5, and the collector C8 of a transistor T8 is connected to the base B6 of transistor T6. The bases B7, B8 of transistors T7, T8 are connected to ground line 15. A pair of clock-pulse inputs CP1 are connected to the respective emitters E7, E8 of transistors T7, T8 of the half-cell A, and a pair of clock-pulse inputs CP2 are connected to the respective emitters E7, E8 of transistors T7, T8 of half-cell B. The clock-pulses applied to the inputs CP2 are delayed with respect to the clock-pulses applied to the inputs CP1.

A lead 18 connects the outer collector C1' of transistor T1 of half-cell A to the collector C7 and base B5 of transistors T7, T5 of half-cell B. Similarly, a lead 19 extends from the outer collector C2' of transistor T2 of half-cell A to the collector C8 and base B6 of transistors T8, T6 of half-cell B. In a similar manner, half-cell A is connected to the previous cell (not shown) by leads 20, 21, and half-cell B is connected to the next succeeding cell (now shown) by leads 22, 23.

Figure 2:
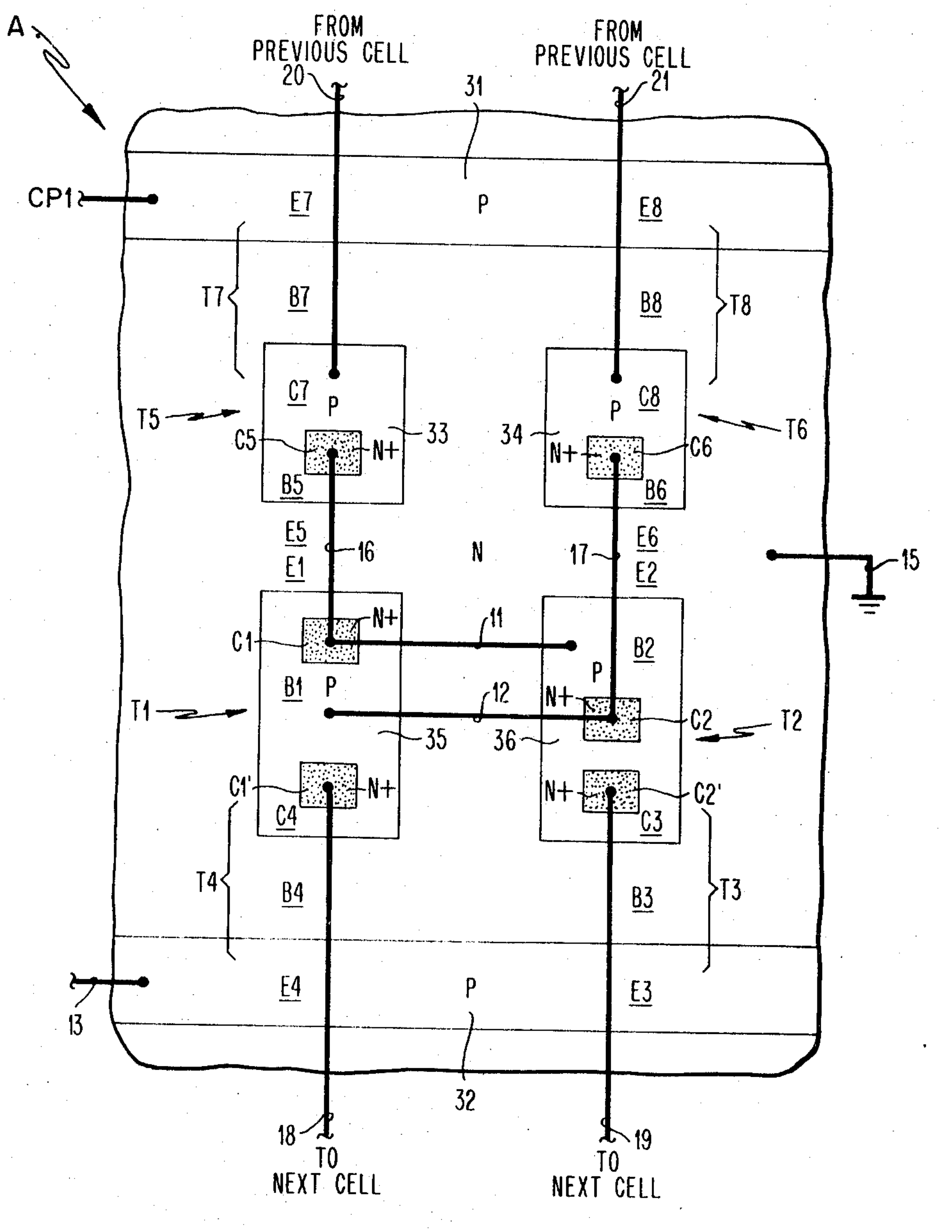
FIG. 2 is a plan view showing the diffusions and interconnections of a single half-cell of the shift register.

The circuitry shown schematically in FIG. 1 may be embodied in an actual physical layout in the manner shown in FIG. 2. It will be seen that the entire structure can be formed with only two diffusion steps. The longitudinal horizontal strips 31, 32 of P type material and the four rectangular areas 33, 34, 35, 36 of P type material are formed in the first diffusion step. A second N +type diffusion is then made to form the inversely operated collectors C1, C1'C2, C2', C5, C6. The equivalent structural elements in FIGS. 1 and 2 are identified by corresponding reference designations.

The layout of FIG. 2 shows that a very small area is utilized although the circuit schematic in FIG. 1 looks rather complex. The small area is possible because of the omission of an isolation diffusion and also because of the merging of devices. For example, a common P-type emitter E3, E4 is used for the lateral PNP load devices T3 and T4 of many cells. The collectors C3, C4 of transistors T3 and T4 are identical with the bases B1, B2 of the inversely operated transistors T1 and T2. A common P-type emitter E7, E8 is also used for the clock-pulse inputs of transistors T7 and T8, and the collectors C7, C8 of the latter are identical with the bases B5, B6 of transistors T5 and T6.

OPERATION

The operation of the shift register in accordance with the present invention is as follows. In standby condition, a very low DC cell current is applied to the cells. Both transistors T5 and T6 are cut off because there is no current supplied from the clock-pulse lines CP1 and CP2. Let there be defined a "1" as stored in half-cell A if transistor T2 of half-cell A IS conducting and as stored in half-cell B if transistor T1 of half-cell B is conducting. The information is shifted from half-cell A to half-cell B by applying a positive clock-pulse to the inputs CP2 causing a collector current to flow in transistors T7, T8 of half-cell B. If transistor T2 of half-cell A IS conducting, the outer collector C2' of half-cell A will taken over the collector current of transistor T8 of half-cell B, whereas the collector current of transistor T7 of half-cell B will flow into the base B5 of transistor T5 of half-cell B. Transistor T5 is therefore turned on and switches the transistor T2 of half-cell B off. Thus, transistor T1 of half-cell B is now conducting and stores the same information that is stored in half-cell A.

In a similar manner, the information of half-cell B is shifted to half-cell A of the following cell (not shown) when clock-pulses are applied to the inputs CP1 of the following cell.

It is to be understood that the specific embodiment disclosed herein is merely illustrative of one of the many forms which the invention may taken in practice and that numerous modifications thereof will readily occur to those skilled in that art without departing from the scope of the invention as delineated in the appended claims, and that the claims are to be constructed as broadly as permitted by the prior art.

I claim:

1. A shift register comprising
a first half-cell and a second half-cell, each half-cell including:
a first pair of transistors each having dual collectors and a base,
conductive means coupling the base of each transistor to one of the collectors of the other transistor,
a second pair of transistors each having a base and a collector connected to a respective one of said collectors, and
a third pair of transistors each having a collector connected to the base of a respective one of said second pair of transistors, and
means connecting the other collector of each of said first pair of transistors of said first half-cell to a respective one of the collectors of said third pair of transistors of said second half-cell.

2. A shift register as recited in claim 1 wherein each transistor of said third pair of transistors has an emitter, and means for applying clock-pulse signals to said emitters.

3. A shift register as recited in claim 1 wherein
said first and second pair of transistors are inversely operated and are provided with emitters, and
means for connecting said last-recited emitters to a common ground.

4. A shift register comprising
a first half-cell and a second half-cell,
each half-cell including:
a first pair of transistors each having dual collectors and a base,
conductive means coupling the base of each transistor to one of the collectors of the other transistor, and
means including the other collectors for transferring information stored in said first half-cell to said second half-cell.

5. A shift register as recited in claim 4 wherein
each half-cell further includes
A second pair of transistors each having a collector connected to a respective one of said dual collectors.

6. A shift register as recited in claim 5 wherein each half-cell further includes
a third pair of transistors each having a collector connected to a respective one of said second pair of transistors.

7. A shift register as recited in claim 6 wherein
each of said third pair of transistors has an emitter, and means for applying a clock-pulse signals to said emitters.

8. A shift register as recited in claim 6 wherein
said first and second pairs of transistors are inversely operated and are provided with emitters, and
means for connecting said last-recited emitters to a common ground.

9. A shift register as recited in claim 4 wherein
said last-recited means comprises
a transistor having a collector and a base,
means connecting the last-recited collector to one of the dual collectors of the second half-cell,
another transistor having a collector connected to the base of the last-recited transistor, and
means connecting one of the dual collectors of the fist half-cell to said collector of said last-recited transistor.

10. A shift register as recited in claim 9 wherein said last-recited transistor is provided with an emitter, and means for applying clock-pulse signals to said emitter.

* * * * *

PO-1050
(5/69)

UNITED STATES PATENT OFFICE
CERTIFICATE OF CORRECTION

Patent No. 3,655,999 Dated November 10, 1972

Inventor(s) Siegfried K. Wiedmann

It is certified that error appears in the above-identified patent and that said Letters Patent are hereby corrected as shown below:

| | |
|---|---|
| Column 2, Line 20 (In the Specification Page 4, Line 22) | after "cell" change "now" to -- not -- |
| Column 4, Line 27 (In the Claims, Claim 9, Line 8) | change "fist" to -- first -- |

Signed and sealed this 6th day of March 1973.

(SEAL)
Attest:

EDWARD M. FLETCHER, JR.
Attesting Officer

ROBERT GOTTSCHALK
Commissioner of Patents